(12) United States Patent
Poornachandran et al.

(10) Patent No.: US 10,761,951 B2
(45) Date of Patent: Sep. 1, 2020

(54) FPGA BASED FUNCTIONAL SAFETY CONTROL LOGIC (FFSCL)

(71) Applicant: Intel Corporation, Santa Clara, CA (US)

(72) Inventors: Rajesh Poornachandran, Portland, OR (US); Nagasubramanian Gurumoorthy, Portland, OR (US); Vincent Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 15/856,316

(22) Filed: Dec. 28, 2017

(65) Prior Publication Data

US 2019/0049912 A1 Feb. 14, 2019

(51) Int. Cl.
*G06F 11/00* (2006.01)
*G06F 11/20* (2006.01)
(Continued)

(52) U.S. Cl.
CPC ...... *G06F 11/2028* (2013.01); *G05B 19/0421* (2013.01); *G05B 19/0425* (2013.01);
(Continued)

(58) Field of Classification Search
CPC ............ G05B 19/0421; G05B 19/0425; G06F 11/202; G06F 11/2028; G06F 11/2033; G06F 11/2043
See application file for complete search history.

(56) References Cited

U.S. PATENT DOCUMENTS 5,931,959 A * 8/1999 Kwiat ................. G06F 11/1487
714/11
2012/0204059 A1* 8/2012 Preston ................... B60R 25/00
714/10
(Continued)

OTHER PUBLICATIONS

Ravindran et al., "An FPGA-based soft multiprocessor system for IPv4 packet forwarding", Aug. 24-26, 2005, International Conference of Field Programmable Logic and Applications, 2005, IEEE. (Year: 2005).*
Patel et al., "A Scalable FPGA-based Multiprocessor", Apr. 24-26, 2006, 2006 14th Annual IEEE Symposium on Field-Programmable Custom Computing Machines, IEEE (Year: 2006).*
Dorta et al., "Overview of FPGA-Based Multiprocessor Systems", Dec. 9-11, 2009, 2009 International Conference on Reconfigurable Computing and FPGAs, IEEE, pp. 273-278 (Year: 2009).*
(Continued)

*Primary Examiner* — Michael Maskulinski
(74) *Attorney, Agent, or Firm* — Spectrum IP Law Group LLC

(57) ABSTRACT

An apparatus to implement functional safety control logic (FSCL) in an autonomous driving system comprises a field-programmable gate array (FPGA) comprising logic elements to be partitioned into a first section to implement one or more safety cores and a second section to implement one or more non-safety cores, a memory to couple to the safety core or to the non-safety core, and a trusted execution environment (TEE) to couple to a remote administrator via a network and to apply a configuration received from the remote administrator to the FPGA. The safety core is to function as an active agent for FSCL during operation, and the non-safety core is to function as a failover agent during operation, and wherein the non-safety core is to perform a liveliness check on the safety core to monitor for a failover and to take over as the active agent in the event of a failover.

22 Claims, 13 Drawing Sheets

(51) Int. Cl.
  *G05B 19/042* (2006.01)
  *G06F 21/57* (2013.01)
  *G06F 30/15* (2020.01)
  *G06F 30/34* (2020.01)
  *G06F 30/392* (2020.01)
  *H04B 1/40* (2015.01)
  *G06F 117/08* (2020.01)

(52) U.S. Cl.
  CPC ........ *G05B 19/0428* (2013.01); *G06F 11/202* (2013.01); *G06F 11/2033* (2013.01); *G06F 21/57* (2013.01); *G06F 30/15* (2020.01); *G06F 30/34* (2020.01); *G06F 30/392* (2020.01); *G05B 2219/21109* (2013.01); *G06F 2117/08* (2020.01); *H04B 1/40* (2013.01)

(56) References Cited

U.S. PATENT DOCUMENTS

| | | | | |
|---|---|---|---|---|
| 2013/0131840 | A1* | 5/2013 | Govindaraj | G05B 19/41865 700/19 |
| 2016/0070932 | A1* | 3/2016 | Zimmer | G06F 21/72 713/192 |
| 2016/0080320 | A1* | 3/2016 | Barakat | H04L 63/00 726/4 |
| 2017/0093852 | A1* | 3/2017 | Khosravi | H04L 63/0861 |
| 2017/0270014 | A1* | 9/2017 | Poledna | B60W 50/00 |
| 2018/0231949 | A1* | 8/2018 | Izzo | G05B 19/0428 |
| 2018/0285217 | A1* | 10/2018 | Smith | G06F 11/0757 |

OTHER PUBLICATIONS

Meiyuan Zhao, "Advanced Driver Assistant System", Threats, Requirements, Security Solutions, Security & Privacy Research, Intel Labs, 36 pages, dated 2016.

Wikipedia, ISO 26262, Titled "Road Vehicles—Functional Safety", Retrieved from "https://en.wikipedia.org/w/index.php?title=ISO_26262&oldid=946528313", 9 pages, dated 2011.

Igor Skochinsky, "Intel ME Secrets Hidden code in your chipset and how to discover what exactly it does", Code Blue 2014, 50 pages, dated 2014.

Jack Wallen, "s the Intel Management Engie a backdoor?" (hacker inside), (http://news.softpedia.com/news/intel-x86-cpus-come-with-a-secret-backdoor-that-nobody-can-touch-or-disable-505347.shtml), Jul. 1, 2016, 18 pages.

Gerwin Klein, et al. "SeL4: Formal Verification of an OS Kernel", Rights Link4, pp. 208-220, Oct. 11-14, 2009.

Ryan Paul, "Linux kernel in 2011: 15 million total lines of code and Microsoft is a top contributor", BIZ & IT, A study published by the Linus Foundation shows that Linux kernel and its . . . 8 pp., Apr. 4, 2012.

Thomas Kropf, "Introduction to Formal Hardware Verification", Library of Congress Cataloging-in-Publication Data applied for Die Deutsche Bibliothek—CIP-Einheitsaufnahme, ISBN 978-3-642-08477-5 ISBN 978-3-662-03809-3 (eBook) DOI 10.1007/978-3-662-03809-3 ACM Computing Classification (1998):B.I.2, B.2.2, BAA, B.5.2, B.6.3, 1.2.3 ISBN 978-3-642-08477-5, 309 pages, dated 1998.

\* cited by examiner

FPGA BASED FUNCTIONAL SAFETY CONTROL LOGIC (FFSCL)

FIELD

The present disclosure generally relates to the field of electronics. More particularly, an embodiment relates to automotive systems and autonomous driving.

BACKGROUND

The technology of automotive systems and autonomous driving is rapidly developing. For autonomous driving, the automotive industry mandates stringent functional safety requirements and expects technology providers to certify their devices for autonomous driving deployments. Currently, these standards are being met with microcontrollers having simple real-time operating systems (RTOS) that are capable of booting directly. As autonomous driving becomes more complex and requires more computing power, higher performance processors increasingly will be used. No matter the platform, functional safety certifications involve exposing the source code to evaluators for analysis. Some manufacturers, however, may prefer not to expose all of their source code due to concerns about revealing propriety advantages, yet may still desire to meet the functional safety certifications for autonomous driving applications.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Figure 1:
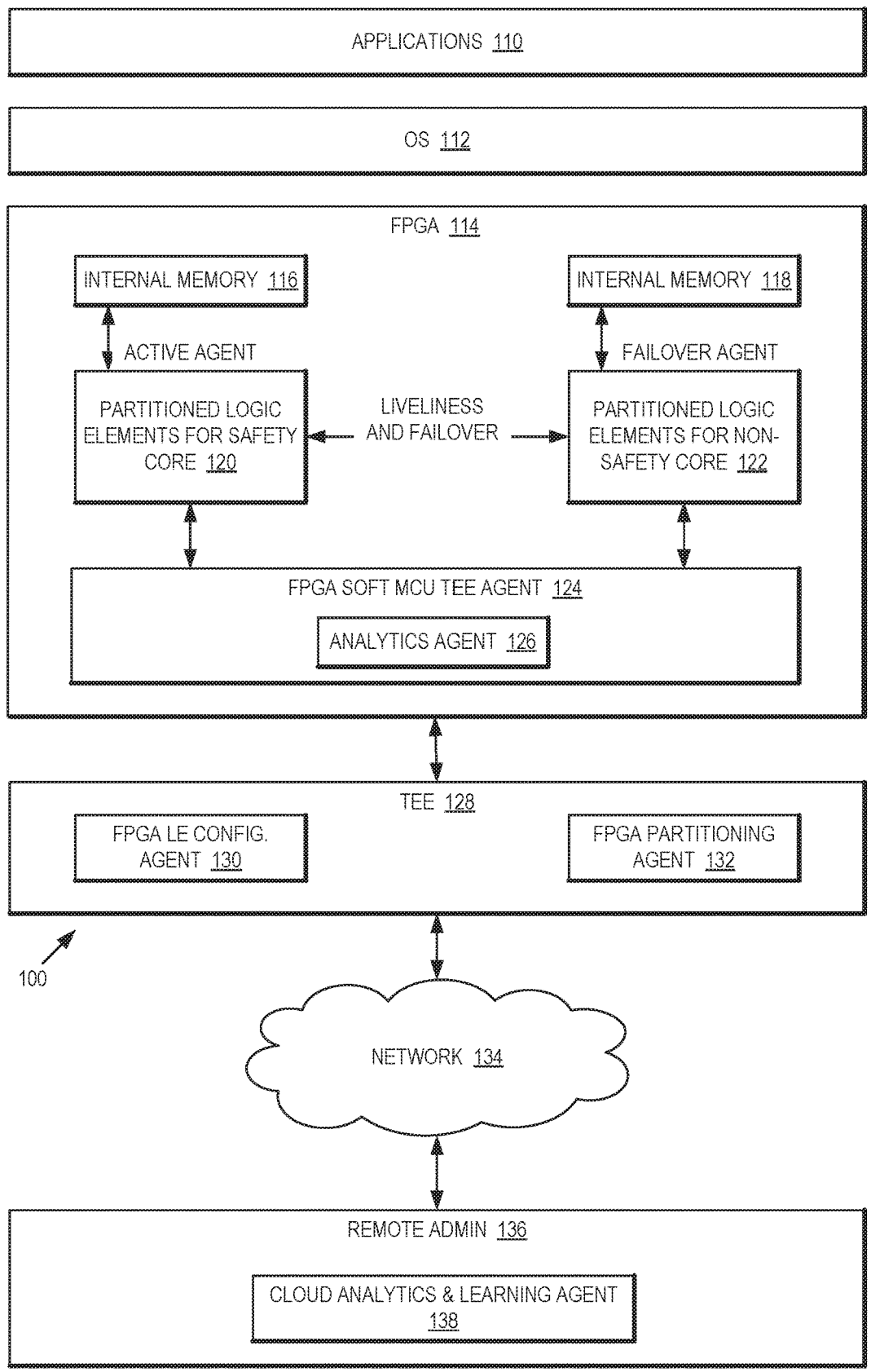
FIG. 1 is a diagram of a high-level system architecture in which an FPGA is partitioned into logic elements for a safety core and logic elements for a non-safety core in accordance with one or more embodiments.

Referring now to FIG. 1, a diagram of a high-level system architecture in which a field-programmable gate array (FPGA) is partitioned into logic elements for a safety core and logic elements for a non-safety core in accordance with one or more embodiments will be discussed. As shown in FIG. 1, a microcontroller platform 100 to realize an autonomous driving system may comprise an FPGA 114 that may be partitioned into two sections including a first section 120 comprising partitioned logic elements for a safety core (Sc), and second section 122 comprising partitioned logic elements for a non-safety core (Nc). The arrangement shown in FIG. 1 is capable of leveraging a trusted exaction environment (TEE) 128 and the reconfigurability of FPGA 114 to partition and create secure functional safety control logic versus non-functional safety control logic, that is one or more safety cores (Sc) and one or more non-safety cores (Nc).

The FPGA 114 helps with dynamic partitioning and reconfiguration of microcontroller platform 100 to allow configuration of secure hardware and dedicated connectivity for failover cores. The dynamic partitioning of FPGA 114 may be extended to any microcontroller wherein at least some source code may be disclosed for evaluation and locked down to be tamper resistant guaranteed via secure/trusted boot. In addition, the functional safety control logic (FFSCL) implemented by microcontroller platform 100 may be extended to work across multiple FPGAs 114 to avoid a single point of failure, although the scope of the claimed subject matter is not limited in this respect.

In one or more embodiments, the components of microcontroller platform 100 may include an operating system (OS) 112 and one or more applications 110 to run on microcontroller platform 100. The FPGA 114 includes a first section 120 and a second section 122 of logic for the safety core (Sc) and the non-safety core (Nc), respectively each coupled to internal memory 116 and internal memory 118, respectively. In some embodiments, internal memory 116 and internal memory 118 may share and/or comprise a single memory region, and the scope of the claimed subject matter is not limited in this respect. The FPGA 114 also includes an FPGA Soft microcontroller (MCU) Trusted Execution Environment (TEE) Agent 124. The FPGA Soft MCE TEE Agent 124 is a firmware component running on microcontroller platform 100 inside the FPGA 114 and is the exposed interface for platform TEE interaction.

Microcontroller platform 100 further may include a Trusted Execution Environment (TEE) 128 to provide a tamper resistant environment of computing power and storage independent of a host processor. TEE 128 includes out-of-band communication with FPGA Soft MCU Agent 124 as well as with a remote administrator (REMOTE ADMIN) 136 independent of the host processor. The TEE comprises FPGA logic element (LE) configuration agent 130 and FPGA partitioning agent 132 which are used to configure FPGA 114 for safety and non-safety partitions with hardware communication, and to perform policy based partitioning. The FPGA Soft MCE TEE Agent 124 works with the FPGA LE configuration agent 130 and the FPGS partitioning agent 132 to dynamically configure FPGA 114 to provide an ACTIVE AGENT for the safety core (Sc) and to provide a FAILOVER AGENT for the non-safety core (Nc) with an appropriate liveliness and failover check between them. The FPGA Soft MCE TEE Agent 124 also may include an analytics agent 126 to capture and infer various sensory data during reconfiguration, partitioning and/or failover scenarios.

In one or more embodiments, microcontroller platform 100 may couple to a Remote Administrator (Remote Admin) 136 via network 134. The network 134 may comprise any type of communication network to allow for communication between microcontroller platform 100 and the Remote Admin 136, for example a Wireless Wide Area Network (WWAN) including a cellular network operating in compliance with a Third Generation Partnership Project (3GPP) standard such as a Long-Term Evolution (LTE) standard, an LTE Advanced (LTE-A), a $5^{th}$ Generation (5G) mobile network standard, and so on, a Wireless Local Area Network (WLAN) standard such a network operating in compliance with a Institute of Electrical and Electronics Engineers (IEEE) 802.11x standard or the like, and the scope of the claimed subject matter is not limited in these respects. The Remote Admin 136 comprises one or more remote cloud administrator which has secure out-of-band access to the TEE 128 for FPGA reconfigurability and manageability. The Remote Admin 136 also includes a Cloud Analytics and Learning Agent (Cloud Analytics & Learning Agent) 138 that is cable of performing efficient machine learning on crowd-sourced analytics data from a variety of platforms to fine tune failover or identify pro-active failover scenarios.

In one or more embodiments, the partitioning of FPGA 114 with the capability of at least partial reconfiguration may be utilized to create a safety core (Sc) and a non-safety cores with tamper resistant dedicated hardware connectivity between the cores. Such a mechanism as shown in FIG. 1 further allows for scaling of such safety core vs. non-safety core manageability across one or more FPGAs 114 in a platform in cooperation with TEE 128 such as secure boot.

The FPGA based Functional Safety Control Logic (FFSCL) may involve dynamic partitioning of logic elements first section 120 and logic elements second section 122 and into Safety vs. Non-Safety critical cores with dedicated memory. The partitioned cores realized by logic elements first section 120 and logic elements section second 122 may have a dedicated hardware communication channel for liveliness check and for failover operation, for example if one or more safety cores fail. The FPGA soft MCU TEE agent 124 running within FPGA 114 is capable of performing such manageability with the support of TEE 128 of microcontroller platform 100. The platform TEE 128 may include an out-of-band channel with the FPGA 114 as well as with the external Remote Admin 136 for manageability. The FPGA soft MCU TEE agent 124 handles failover seamlessly transparent to the host OS 112 and/or the operating system kernel. Failover analytics such as geo-fence, other sensory attributes, and so on, may be captured and sent the Remote Admin 136 via network 134, and the cloud analytics and learning agent 138 may apply machine learning techniques to learn and improvise future failovers from crowd-sourced analytics from one or multiple vehicles in which microcontroller platform 100 may be deployed.

The FPGA 114 helps with dynamic partitioning and reconfiguration, wherein the microcontroller size may be determined dynamically, and further may allow the configuration of secure hardware for dedicated connectivity for failover cores. The arrangement of microcontroller platform 100 may be extended for any type or number of microcontrollers as long as at last part of the source code may be disclosed for evaluation and able to be locked down, for example tamper resistant guaranteed via secure and/or trusted boot. Additionally, the FFSCL implemented by microcontroller platform 100 may be extended to work across multiple FPGAs 114 to avoid a single point of failure, although the scope of the claimed subject matter is not limited in this respect.

In one or more embodiments, TEE 128 may be configured to provide Functional Safety Logic functions along with propriety code that may not be disclosed for evaluation purposes. In such embodiments, TEE 128 itself may be decoupled or divided into two regions, a first region that includes the proprietary code, and second region comprising at least a portion of FPGA 114 to provide code that may be disclosed for evaluation. Such an arrangement would allow for the discretion of at least some code to be disposed in TEE 128, or optionally no code in TEE 128 or all code in TEE 128, and/or at least some code to be disposed in FPGA 114 register-transfer level (RTL), wherein code in FGPA 114 further has the option of reconfigurability and/or scalability, along with the ability of disclosure of code in the FPGA 114, although the scope of the claimed subject matter is not limited in these respects.

In one or more embodiments, the register transfer level (RTL) code for FPGA 114 may be shared for evaluation and/or certification but also may be locked with help from TEE 128 to provide tamper resistance. The safety functionality of microcontroller platform 100 may be offloaded to a FPGA accelerator thereby allowing the Converged Security and Management Engine (CSME) running on microcontroller platform 100 to continue its workflow. The ability to reconfigure FPGA 114 allows for creation of dedicated failover configurations in hardware to provide liveliness check and failover of a non-safety core of logic elements second section 122 to operate as a safety core dynamically in the event of a failover. The FPGA soft MCU TEE agent 124 handles failover seamlessly transparently to the host OS 112 and/or kernel. Failover analytics such as geo-fence, other sensory attributes, and so on, may be captured and sent to a cloud agent such as cloud analytics and learning agent 138 which may apply machine learning techniques to learn and improvise future failovers from crowd-sourced analytics, although the scope of the claimed subject matter is not limited in these respects. Interaction between the components of FIG. 1 is shown in and described with respect to FIG. 2, below.

Figure 2:
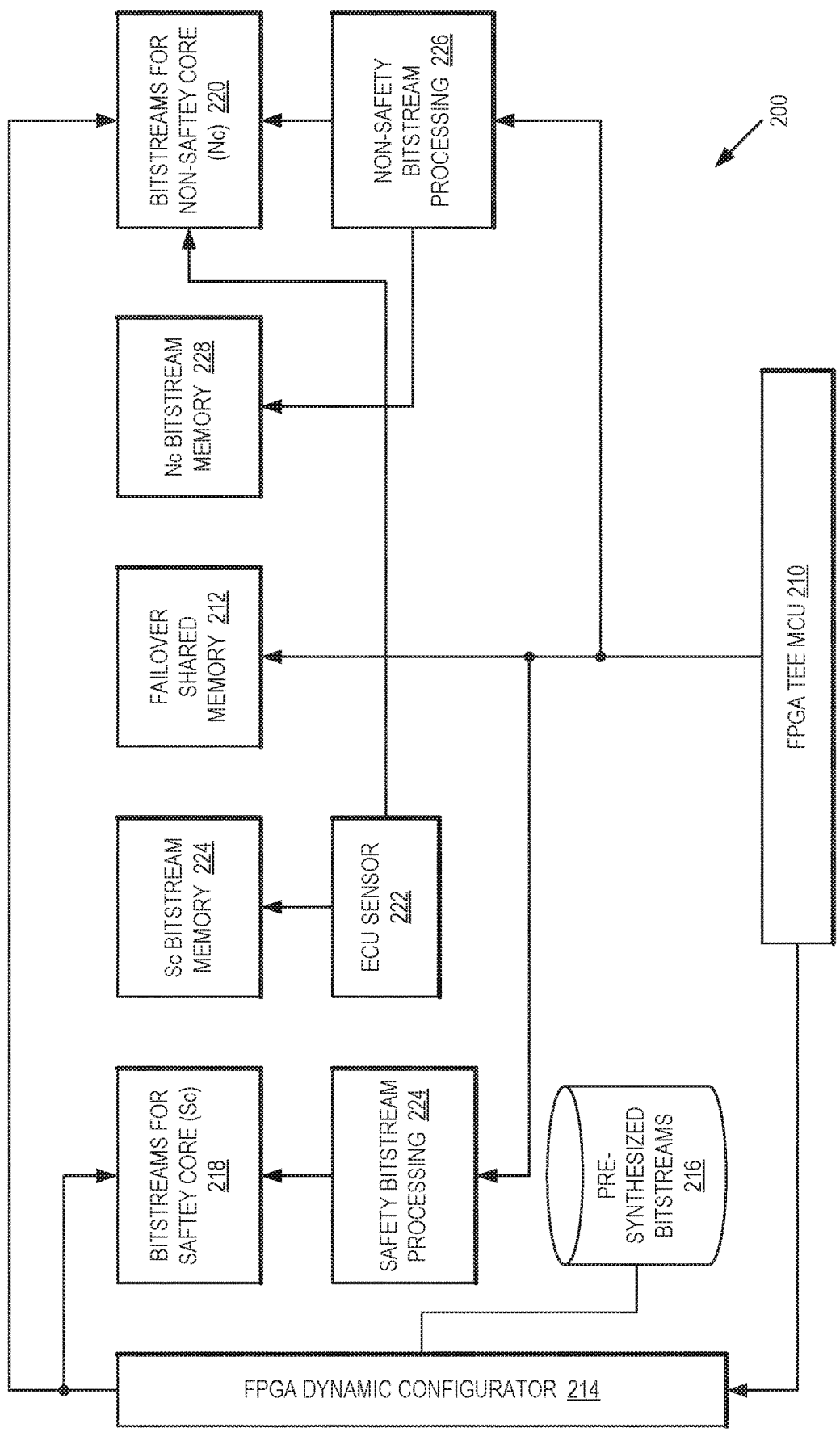
FIG. 2 is a diagram illustrating the interaction between the components of the architecture of FIG. 1 in accordance with one or more embodiments.

Referring now to FIG. 2 a diagram illustrating the interaction between the components of the architecture of FIG. 1 in accordance with one or more embodiments will be discussed. The following sequence of operations may be followed to configure and enable partitioning of the safety logic elements 120 and non-safety logic elements 122 with the support for the platform TEE 128. In one operation, the FPGA TEE MCU 210 performs remote attestation with the cloud administrator such as Remote Admin 136, to get appropriately tailored pre-synthesized FPGA RTL bitstreams 216 to configure the bitstreams for Safety Core 218 and Non-Safety Core 220 partitioning, and associated policies to govern them. The bitstream for the Safety Core 218 may be stored in Safety Core bitstream memory 224, and the bitstream for the Non-Safety Core 220 may be stored in Non-Safety Core memory 228. In another operation, FPGA TEE MCU 210 leverages an out-of-band channel with FPGA Dynamic Configurator 214 to configure the bitstreams and enforce associated policies. In a further operation, FPGA TEE MCU 210 creates the failover shared memory mailbox in failover shared memory 212 for safety and non-safety cores to communicate. Access control properties on this mailbox may be policy configurable and enforced by TEE 128. Safety bitstream processing unit 224 and non-safety bitstream processing unit 226 then configure the general-purpose input/out (GPIO) and/or other registry parameters to retrieve sensory inputs from ECU sensor 222. Configuration of a remote sever of Remote Admin 136 is shown in and described with respect to FIG. 3, below.

Figure 3:
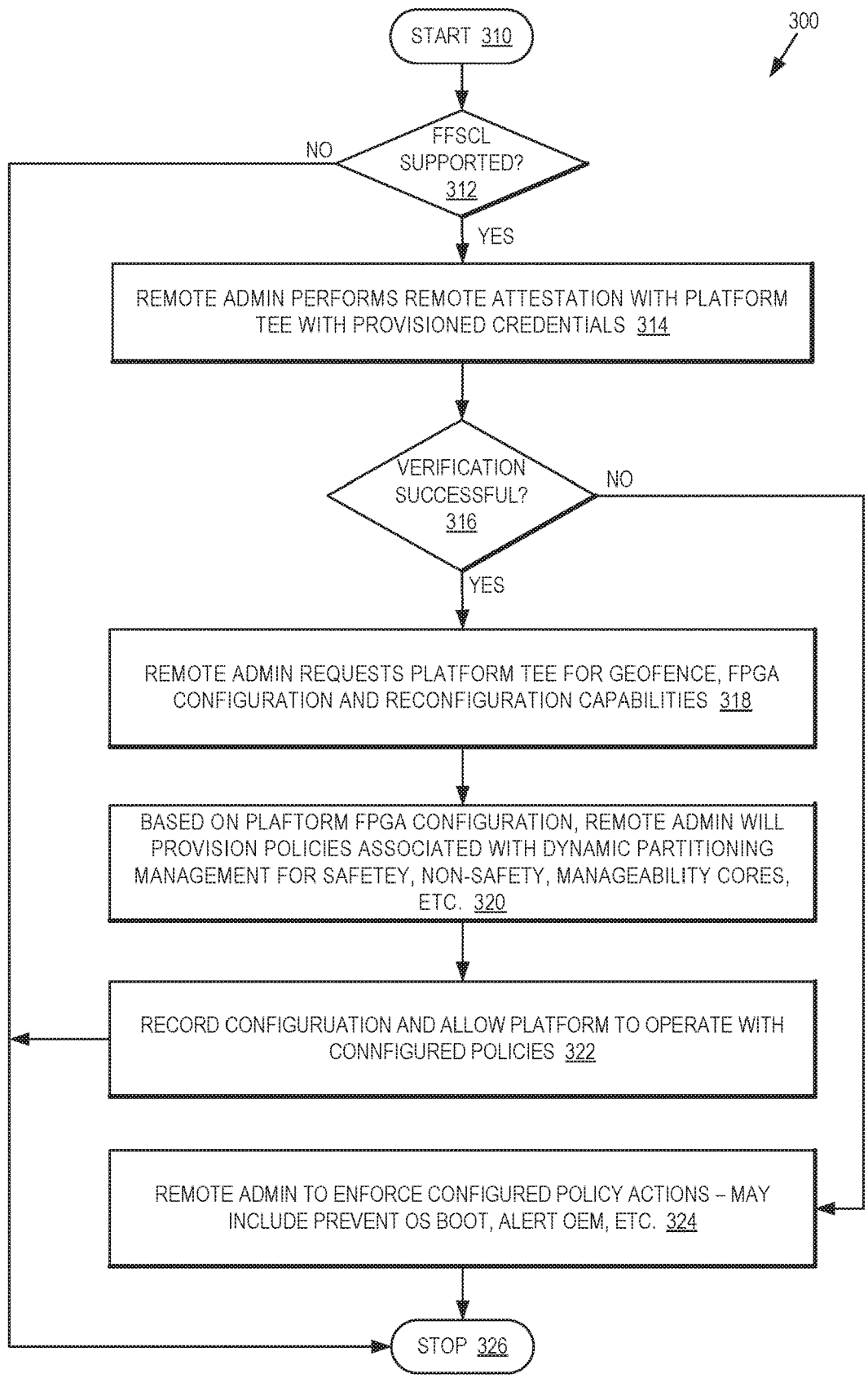
FIG. 3 is a flow diagram of a server configuration in accordance with one or more embodiments.

Referring now to FIG. 3, a flow diagram of a server configuration in accordance with one or more embodiments will be discussed. Although FIG. 3 shows one particular arrangement of flow 300 for configuration of a remote server of Remote Admin 136, it should be noted that the flow 300 may include more or fewer operations and/or in one or more alternative orders, and the scope of the claimed subject matter is not limited in this respect. Flow 300 may start at operation 310, and a determination may be made at decision block 312 whether or not FFSCL is supported. If not, flow stops at operation 326. If FFSCL is supported, then Remote Admin 136 performs remote attestation with platform TEE 128 with provisioned credentials at operation 313. A determination may be made at decision block 316 whether verification was successful. If verification is not successful, then Remote Admin 136 may enforce configured policy actions at operation 324, for example Remote Admin 136 may prevent OS 112 from booting, may alert the original equipment manufacturer (OEM) of the vehicle in which microcontroller platform 100 is deployed, and so on.

If verification is successful, Remote Admin 136 may request platform TEE 128 for a geofence and/or other sensory attributes, and configuration and reconfiguration capabilities of FPGA 114 at operation 318. Based on the configuration of FPGA 114 of microcontroller platform 100, Remote Admin 136 may provision policies associated with dynamic partitioning management for safety cores, non-safety cores, manageability cores, and so on, at block 320. At operation 322, Remote Admin 136 may record the configuration and allow microcontroller platform 100 to operate with the configured policies. The configuration flow of Remote Admin 136 may then end at operation 326. The microcontroller platform 100 may then perform FFSCL client configuration as shown in and described with respect to FIG. 4, below.

Figure 4:
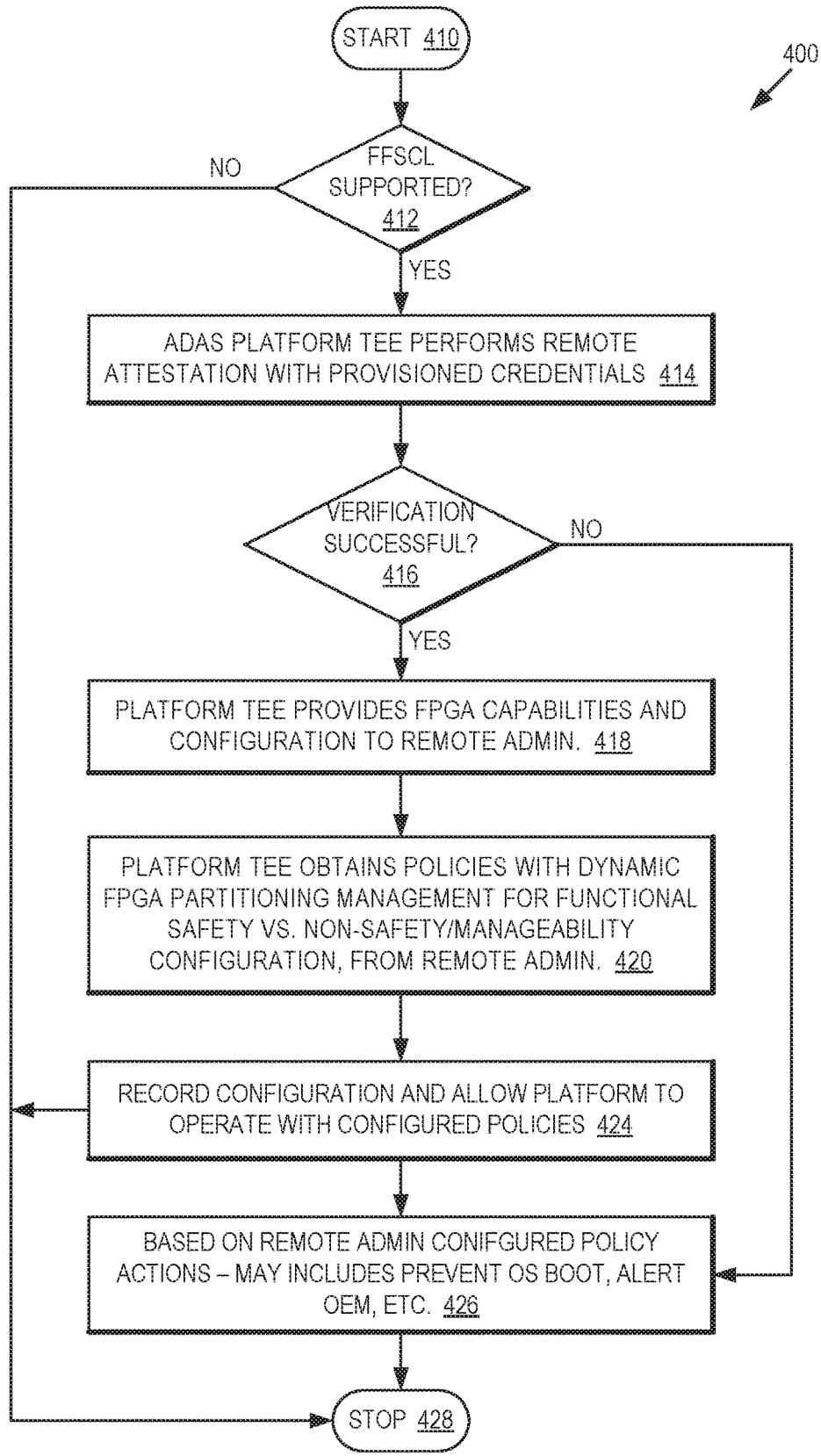
FIG. 4 is a flow diagram of an FFSCL client configuration in accordance with one or more embodiments.

Referring now to FIG. 4, a flow diagram of an FFSCL client configuration in accordance with one or more embodiments will be discussed. Although FIG. 4 shows one particular arrangement of flow 400 for configuration of microcontroller platform 400, it should be noted that the flow 400 may include more or fewer operations and/or in one or more alternative orders, and the scope of the claimed subject matter is not limited in this respect. Flow 400 may start at operation 410, and a determination may be made at decision block 412 whether microcontroller platform 100 supports FFSCL. If not, flow 400 may end at operation 428. If FFSCL is supported, in one example embodiment an advanced driver assistance (ADAS) platform TEE 128 may perform remote attestation with Remote Admin 136 with provisioned credentials at operation 414, although the scope of the claimed subject matter is not limited in this respect. A decision may be made at decision block 416 whether verification is successful. If verification is not successful, microcontroller platform 100 may take one or more actions based on Remote Admin 136 configured policy actions at operation 426. Such configured policy actions may include preventing boot of OS 112, alerting the OEM of the vehicle in which microcontroller platform is deployed, and so on.

If verification is successful, platform TEE 128 may provide the capabilities and configuration of FPGA 114 plus geofence and/or other sensory data to Remote Admin 136 at operation 418. The platform TEE 128 obtains policies with dynamic partitioning management of FPGA 114 for functional safety versus non-safety and/or manageability configuration from Remote Admin 136 at operation 420. Microcontroller platform 100 may then record the configuration and allow operation with the configured policies at operation 424. The flow 400 then may end at operation 428. After the Remote Admin 136 is configured as shown by flow 300 of FIG. 3 and microcontroller platform 100 is configured as shown by flow 400 of FIG. 4, FFSCL operation may occur as shown in and described with respect to FIG. 5, below.

Figure 5:
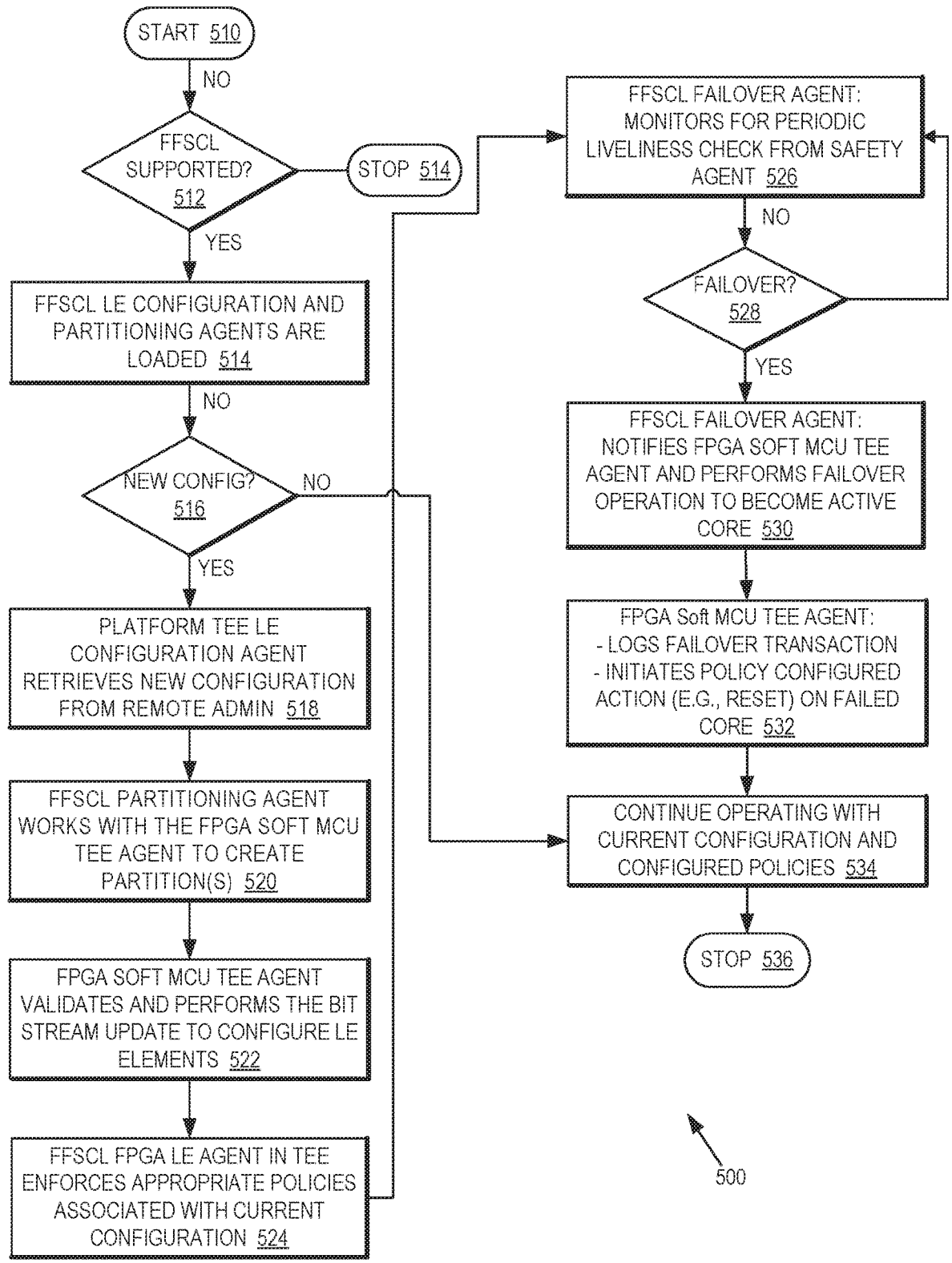
FIG. 5 is a flow diagram of an operation of FFSCL in accordance with one or more embodiments.

Referring now to FIG. 5, a flow diagram of an operation of FFSCL in accordance with one or more embodiments will be discussed. After configuration of Remote Admin 136 and microcontroller platform 100, flow 500 of FIG. 5 may be implemented by microcontroller platform 100. Although FIG. 5 shows one particular arrangement of flow 500, it should be noted that the flow 500 may include more or fewer operations and/or in one or more alternative orders, and the scope of the claimed subject matter is not limited in this respect. Flow 500 may start at operation 510. A determination may be made at decision block 512 whether FFSCL is supported. If FFSCL is not supported, then flow 500 may stop at operation 514. If FFSCL is supported, then FPGA LE configuration agent 130 and FPGA partitioning agent 132 may be loaded at operation 514. A determination may be made at decision block 516 whether a new configuration for microcontroller platform 100 is available, for example by sending in inquiry to or receiving a notification from Remote Admin 136 regarding the availability of a new configuration. If a new configuration is not available, microcontroller platform 100 may continue operating with the current configuration and the current configured policies at operation 534, and flow 500 may end at operation 536.

If a new configuration is available, then the FPGA LE configuration agent 130 of TEE 128 may retrieve the new configuration from the Remote Admin 136 at operation 518. The FPGA partitioning agent 132 works with the FPGA soft MCU TEE agent to create one or more partitions for FPGA 114 at operation 520. At operation 522, the FPGA soft MCU TEE agent 124 then validates and performs the bitstream updated to configure partitioned logic elements first section 120 and partitioned logic elements second section 122. If validation fails, then the failure may be logged, or policy based action may be taken as shown in FIG. 3 and/or FIG. 4. The FPGA LE agent 130 in TEE 128 then enforces appropriate policies associated with the current configuration at operation 524. The failover agent realized by partitioned logic elements second section 122 for the non-safety core monitors for a periodic liveliness check from the active safety agent realized by partitioned logic elements first section 120 for the safety core. A determination may by made via the periodic liveliness check if a failover has occurred at decision block 529. If no failover has occurred, then the failover agent continues to periodically monitor for a liveliness check at operation 524 and determining if a failover has occurred at decision block 528.

If the failover agent, realized by the partitioned logic elements second section 122 for the non-safety core, determines that a failover has occurred, at operation 530 the failover agent notifies the FPGA soft MCU TEE agent 124 of the failover, and performs a failover operation to take over duties from the safety core to become the new active core. The FPGA soft TEE agent 124 then logs the failover transaction, initiates a policy configured action such as a reset on the failed safety core at operation 532. At this point, microcontroller platform 100 may then continue operating with the current configuration and the current configured policies at operation 534, with the non-safety core now operating as the new active agent, and flow 500 may stop at operation 536.

If the FPGA soft MCU TEE agent 124 is able to successfully reset the safety core, then the safety core may then resume duties as the active agent, and the non-safety core may resume duties as the failover agent such that flow 500 may be resumed as normal. If the FPGA soft MCE TEE agent 124 is not able to successfully reset the safety core, then the non-safety core may continue duties as the active agent, for example until the vehicle can be serviced, although the scope of the claimed subject matter is not limited in these respects.

Boilerplate Figures Discussion

Figure 6:
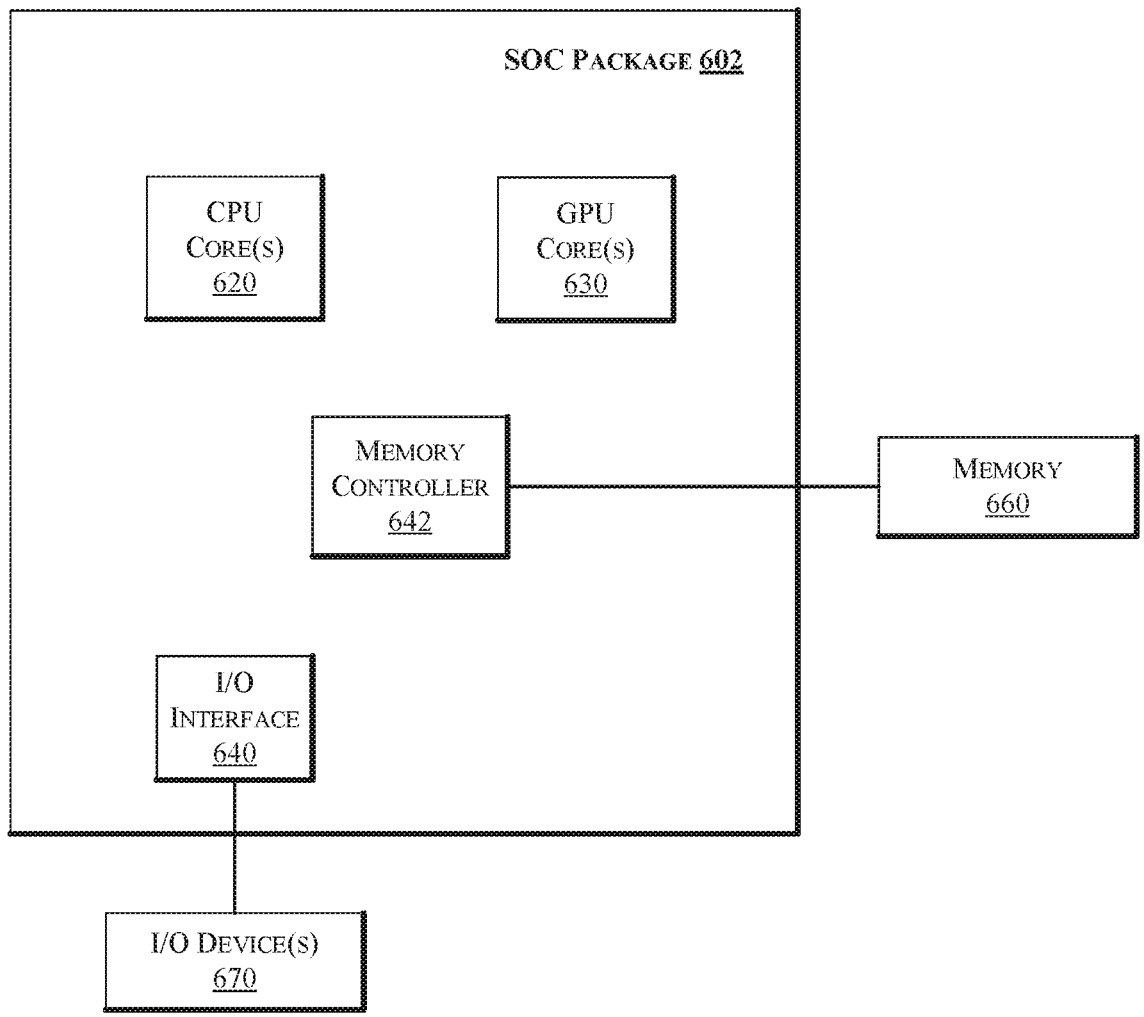
FIG. 6 illustrates a block diagram of a system on chip (SOC) package in accordance with an embodiment.

FIG. 6 illustrates a block diagram of a system on chip (SOC) package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like.

Figure 7:
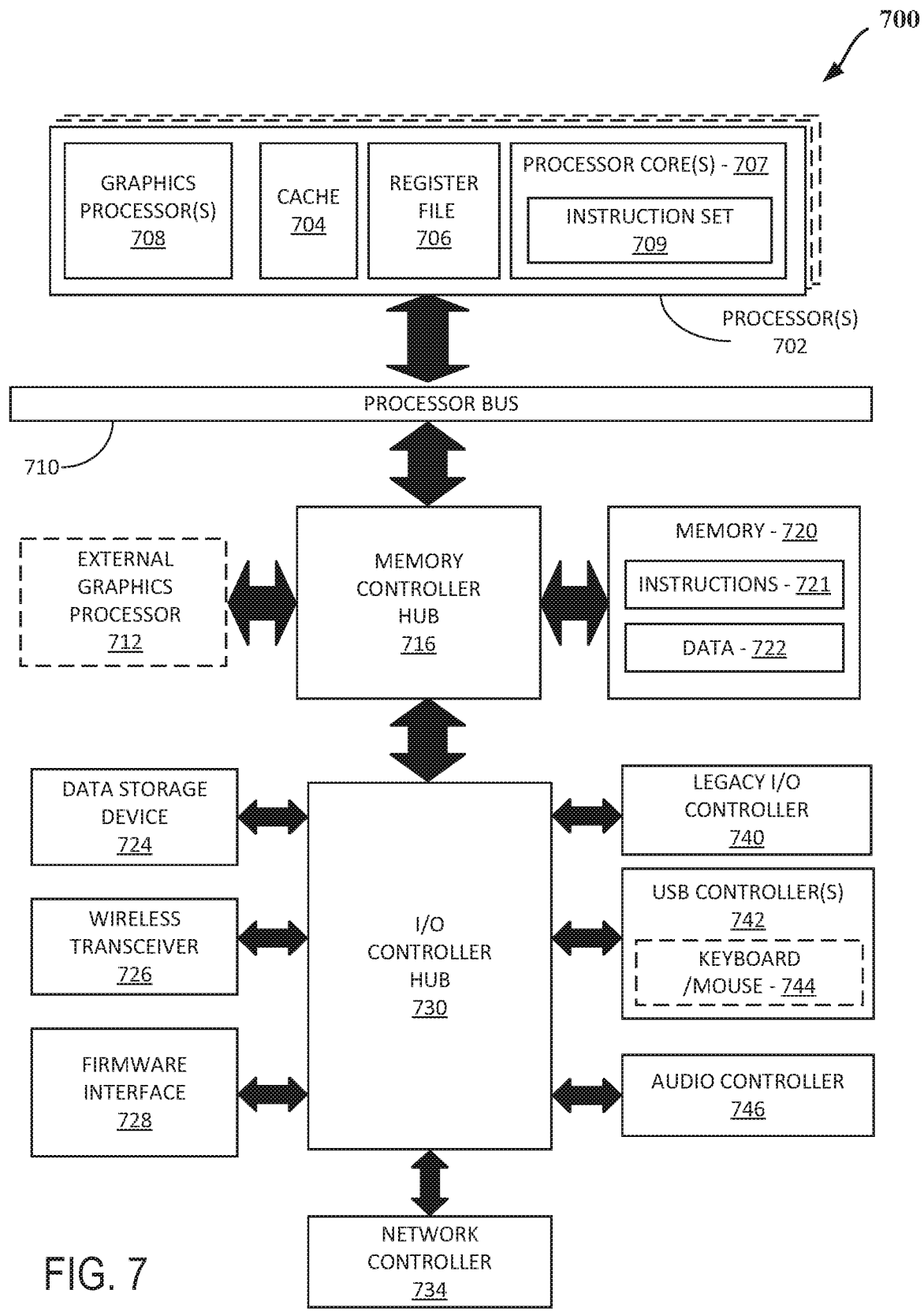
FIG. 7 is a block diagram of a processing system according to an embodiment.

FIG. 7 is a block diagram of a processing system 700, according to an embodiment. In various embodiments the system 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 908.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 907 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit communication signals such as address, data, or control signals between processor 702 and other components in system 700. In one embodiment the system 700 uses an exemplary 'hub' system architecture, including a memory controller hub 716 and an Input Output (I/O) controller hub 730. A memory controller hub 716 facilitates communication between a memory device and other components of system 700, while an I/O Controller Hub (ICH) 730 provides connections to I/O devices via a local I/O bus. In one embodiment, the logic of the memory controller hub 716 is integrated within the processor.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations.

In some embodiments, ICH 730 enables peripherals to connect to memory device 720 and processor 702 via a high-speed I/O bus. The I/O peripherals include, but are not limited to, an audio controller 746, a firmware interface 728, a wireless transceiver 726 (e.g., Wi-Fi, Bluetooth), a data storage device 724 (e.g., hard disk drive, flash memory, etc.), and a legacy I/O controller 740 for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710. It will be appreciated that the system 700 shown is exemplary and not limiting, as other types of data processing systems that are differently configured may also be used. For example, the I/O controller hub 730 may be integrated within the one or more processor 702, or the memory controller hub 716 and I/O controller hub 730 may be integrated into a discreet external graphics processor, such as the external graphics processor 712.

Figure 8:
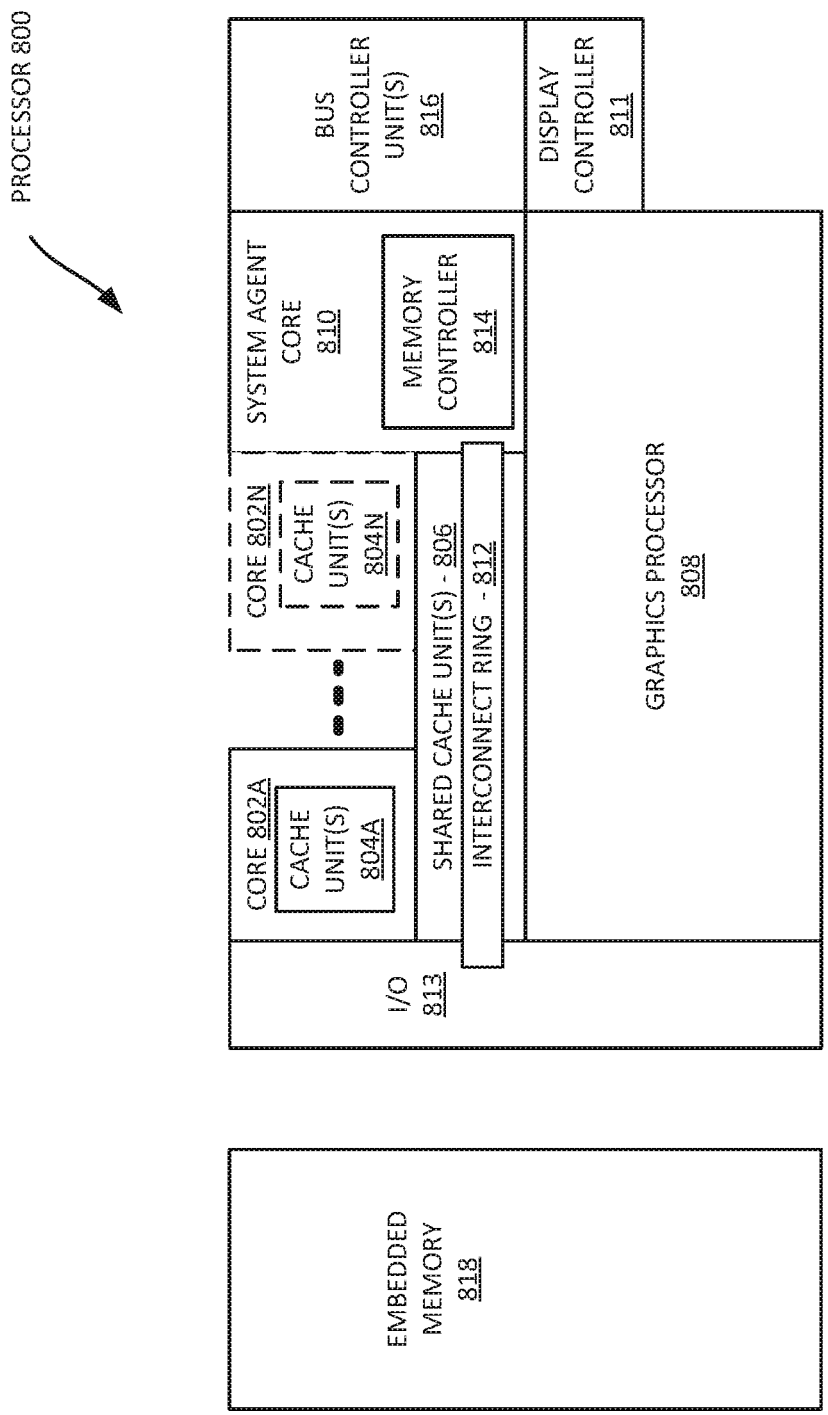
FIG. 8 is a block diagram of a processor having one or more processor cores, an integrated memory controller, and an integrated graphics processor in accordance with one or more embodiments.

FIG. 8 is a block diagram of an embodiment of a processor 800 having one or more processor cores 802A to 802N, an integrated memory controller 814, and an integrated graphics processor 808. Those elements of FIG. 8 having the same reference numbers (or names) as the elements of any other figure herein can operate or function in any manner similar to that described elsewhere herein, but are not limited to such. Processor 800 can include additional cores up to and including additional core 802N represented by the dashed lined boxes. Each of processor cores 802A to 802N includes one or more internal cache units 804A to 804N. In some embodiments each processor core also has access to one or more shared cached units 806.

The internal cache units 804A to 804N and shared cache units 806 represent a cache memory hierarchy within the processor 800. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 806 and 804A to 804N.

In some embodiments, processor 800 may also include a set of one or more bus controller units 816 and a system agent core 810. The one or more bus controller units 816 manage a set of peripheral buses, such as one or more Peripheral Component Interconnect buses (e.g., PCI, PCI Express). System agent core 810 provides management functionality for the various processor components. In some embodiments, system agent core 810 includes one or more integrated memory controllers 814 to manage access to various external memory devices (not shown).

In some embodiments, one or more of the processor cores 802A to 802N include support for simultaneous multi-threading. In such embodiment, the system agent core 810 includes components for coordinating and operating cores 802A to 802N during multi-threaded processing. System agent core 810 may additionally include a power control unit (PCU), which includes logic and components to regulate the power state of processor cores 802A to 802N and graphics processor 808.

In some embodiments, processor 800 additionally includes graphics processor 808 to execute graphics processing operations. In some embodiments, the graphics processor 808 couples with the set of shared cache units 806, and the system agent core 810, including the one or more integrated memory controllers 814. In some embodiments, a display controller 811 is coupled with the graphics processor 808 to drive graphics processor output to one or more coupled displays. In some embodiments, display controller 811 may be a separate module coupled with the graphics processor via at least one interconnect, or may be integrated within the graphics processor 808 or system agent core 810.

In some embodiments, a ring based interconnect unit 812 is used to couple the internal components of the processor 800. However, an alternative interconnect unit may be used, such as a point-to-point interconnect, a switched interconnect, or other techniques, including techniques well known in the art. In some embodiments, graphics processor 808 couples with the ring interconnect 812 via an I/O link 813.

The exemplary I/O link 813 represents at least one of multiple varieties of I/O interconnects, including an on package I/O interconnect which facilitates communication between various processor components and a high-performance embedded memory module 818, such as an eDRAM (or embedded DRAM) module. In some embodiments, each of the processor cores 802 to 802N and graphics processor 808 use embedded memory modules 818 as a shared Last Level Cache.

In some embodiments, processor cores 802A to 802N are homogenous cores executing the same instruction set architecture. In another embodiment, processor cores 802A to 802N are heterogeneous in terms of instruction set architecture (ISA), where one or more of processor cores 802A to 802N execute a first instruction set, while at least one of the other cores executes a subset of the first instruction set or a different instruction set. In one embodiment processor cores 802A to 802N are heterogeneous in terms of microarchitecture, where one or more cores having a relatively higher power consumption couple with one or more power cores having a lower power consumption. Additionally, processor 800 can be implemented on one or more chips or as an SoC integrated circuit having the illustrated components, in addition to other components.

Figure 9:
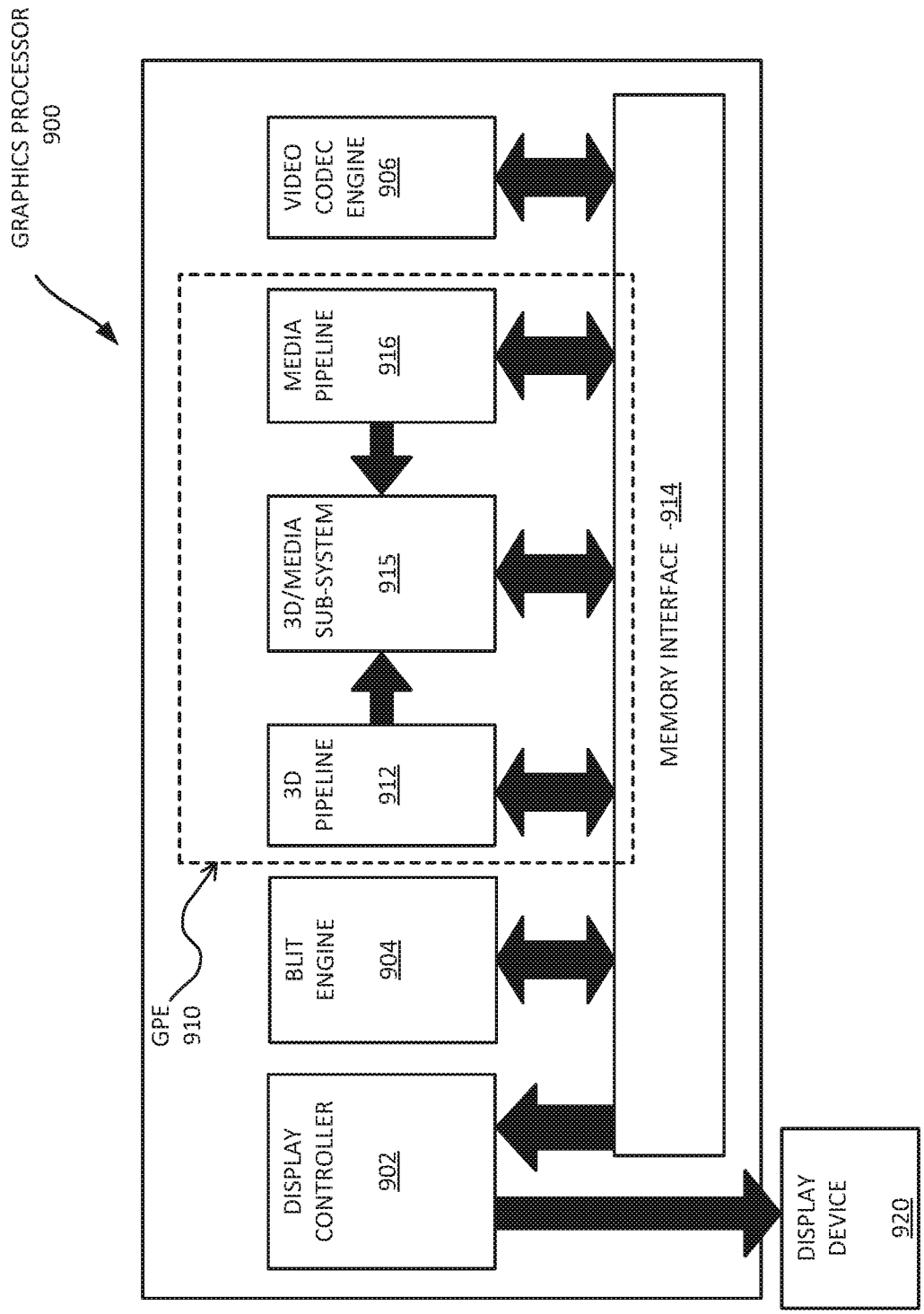
FIG. 9 is a block diagram of a graphics processor, which may be a discrete graphics processing unit, or may be a graphics processor integrated with a plurality of processing cores in accordance with one or more embodiments.

FIG. 9 is a block diagram of a graphics processor 900, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 900 includes a memory interface 914 to access memory. Memory interface 914 can be an interface to local memory, one or more internal caches, one or more shared external caches, and/or to system memory.

In some embodiments, graphics processor 900 also includes a display controller 1102 to drive display output data to a display device 920. Display controller 902 includes hardware for one or more overlay planes for the display and composition of multiple layers of video or user interface elements. In some embodiments, graphics processor 900 includes a video codec engine 906 to encode, decode, or transcode media to, from, or between one or more media encoding formats, including, but not limited to Moving Picture Experts Group (MPEG) formats such as MPEG-2, Advanced Video Coding (AVC) formats such as H.264/ MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 900 includes a block image transfer (BLIT) engine 904 to perform two-dimensional (2D) rasterizer operations including, for example, bit-boundary block transfers. However, in one embodiment, 11D graphics operations are performed using one or more components of graphics processing engine (GPE) 910. In some embodiments, graphics processing engine 910 is a compute engine for performing graphics operations, including three-dimensional (3D) graphics operations and media operations.

In some embodiments, GPE 910 includes a 3D pipeline 912 for performing 3D operations, such as rendering three-dimensional images and scenes using processing functions that act upon 3D primitive shapes (e.g., rectangle, triangle, etc.). The 3D pipeline 912 includes programmable and fixed function elements that perform various tasks within the element and/or spawn execution threads to a 3D/Media sub-system 915. While 3D pipeline 912 can be used to perform media operations, an embodiment of GPE 910 also includes a media pipeline 916 that is specifically used to perform media operations, such as video post-processing and image enhancement.

In some embodiments, media pipeline 916 includes fixed function or programmable logic units to perform one or more specialized media operations, such as video decode acceleration, video de-interlacing, and video encode acceleration in place of, or on behalf of video codec engine 906. In some embodiments, media pipeline 916 additionally includes a thread spawning unit to spawn threads for execution on 3D/Media sub-system 915. The spawned threads perform computations for the media operations on one or more graphics execution units included in 3D/Media sub-system 1115.

In some embodiments, 3D/Media subsystem 915 includes logic for executing threads spawned by 3D pipeline 912 and media pipeline 916. In one embodiment, the pipelines send thread execution requests to 3D/Media subsystem 915, which includes thread dispatch logic for arbitrating and dispatching the various requests to available thread execution resources. The execution resources include an array of graphics execution units to process the 3D and media threads. In some embodiments, 3D/Media subsystem 915 includes one or more internal caches for thread instructions and data. In some embodiments, the subsystem also includes shared memory, including registers and addressable memory, to share data between threads and to store output data.

Figure 10:
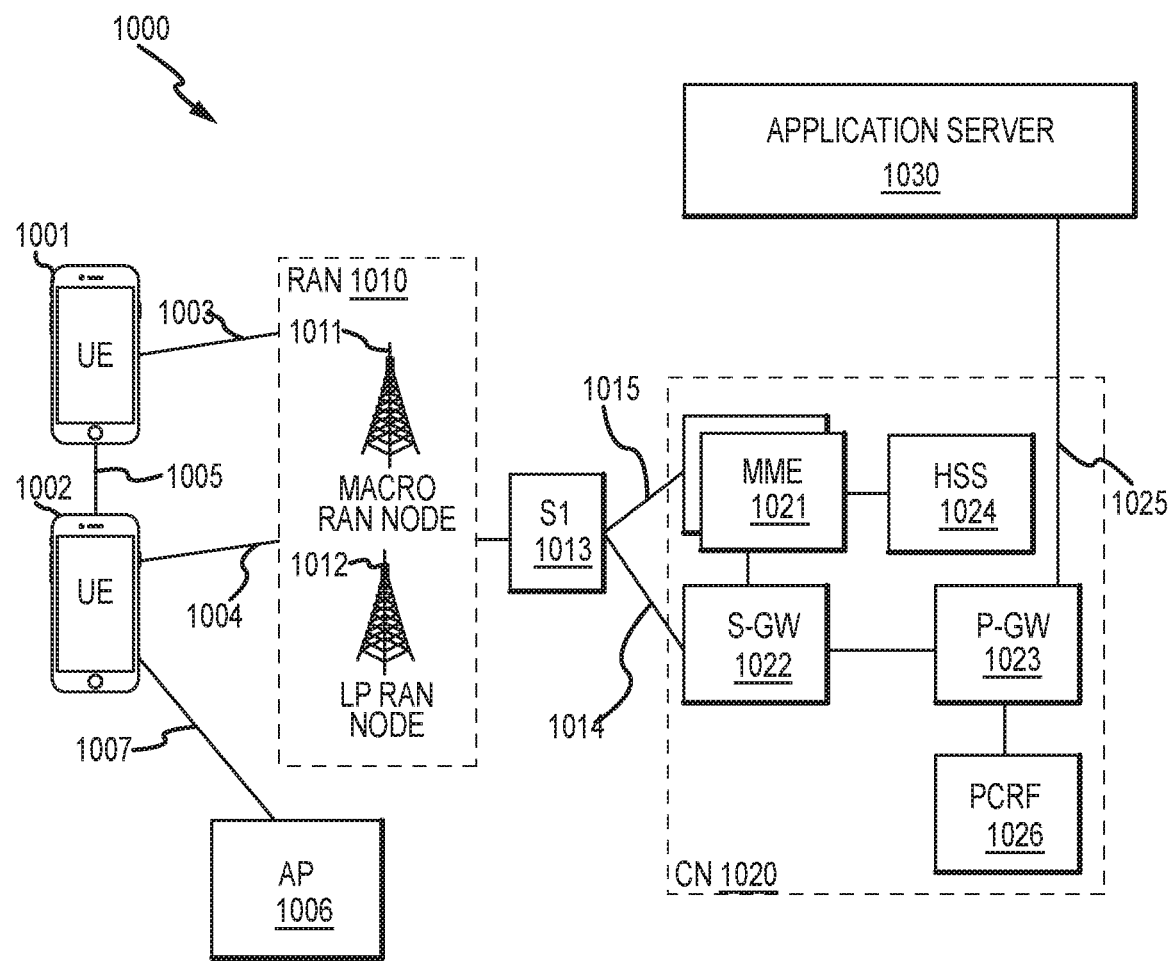
FIG. 10 illustrates an architecture of a system of a network in accordance with one or more embodiments.

FIG. 10 illustrates an architecture of a system 1000 of a network in accordance with some embodiments. The system 1000 is shown to include a user equipment (UE) 1001 and a UE 1002. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, automobile or automobile system, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1002 is shown to be configured to access an access point (AP) 1006 via connection 1007. The connection 1007 can comprise a local wireless connection, such as a connection consistent with any IEEE 802.11 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network 1023 and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
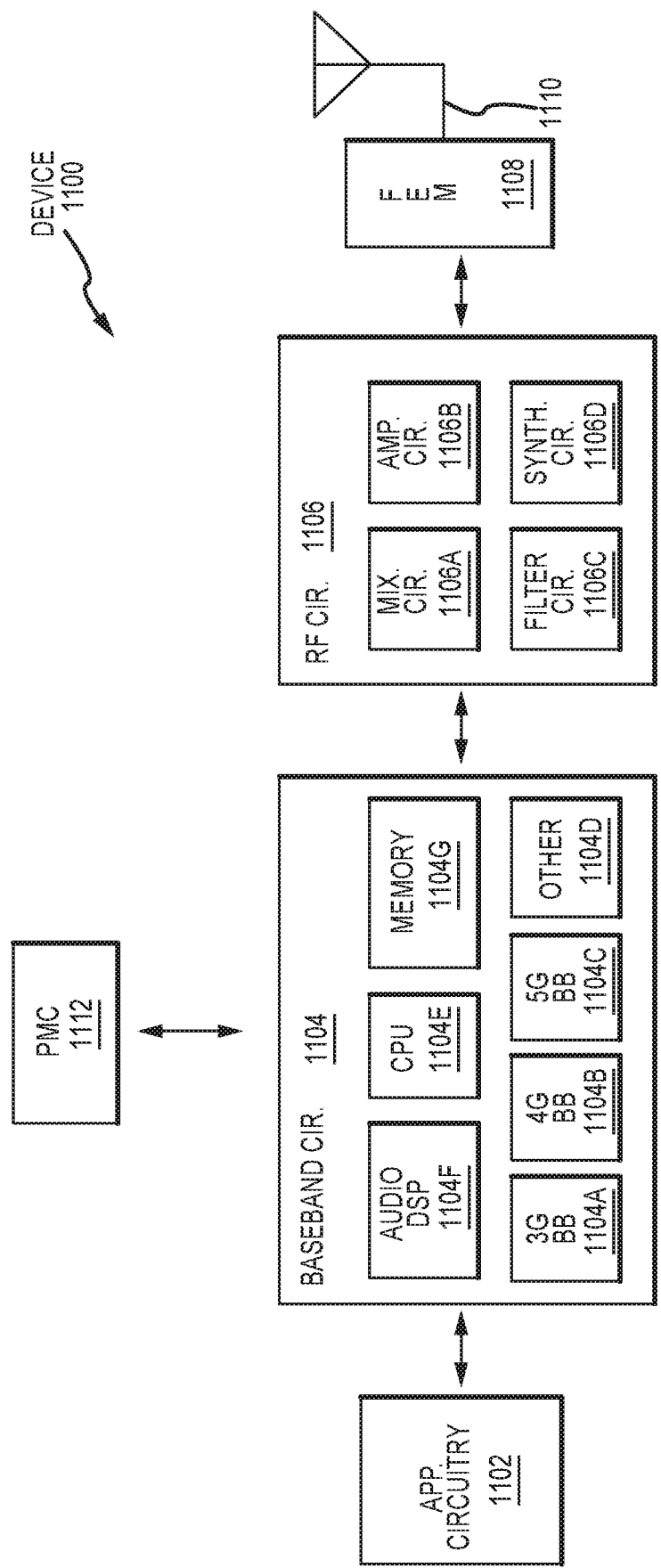
FIG. 11 illustrates example components of a wireless communication device in accordance with one or more embodiments.

FIG. 11 illustrates example components of a device in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuity 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), sixth generation (6G), etc.). The baseband circuitry 1104 (e.g., one or more of baseband processors 1104A-D) may handle various radio control functions that enable communication with one or more radio networks via the RF circuitry 1106. In other embodiments, some or all of the functionality of baseband processors 1104A-D may be included in modules stored in the memory 1104G and executed via a Central Processing Unit (CPU) 1104E. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104F. The audio DSP(s) 1104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106*d* for synthesizing a frequency for use by the mixer circuitry 1106*a* of the receive signal path and the transmit signal path. In some embodiments, the mixer circuitry 1106*a* of the receive signal path may be configured to down-convert RF signals received from the FEM circuitry 1108 based on the synthesized frequency provided by synthesizer circuitry 1106*d*. The amplifier circuitry 1106*b* may be configured to amplify the down-converted signals and the filter circuitry 1106*c* may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106*a* of the receive signal path may comprise passive mixers, although the scope of the embodiments is not limited in this respect.

In some embodiments, the mixer circuitry 1106*a* of the transmit signal path may be configured to up-convert input baseband signals based on the synthesized frequency provided by the synthesizer circuitry 1106*d* to generate RF output signals for the FEM circuitry 1108. The baseband signals may be provided by the baseband circuitry 1104 and may be filtered by filter circuitry 1106*c*.

In some embodiments, the mixer circuitry 1106*a* of the receive signal path and the mixer circuitry 1106*a* of the transmit signal path may include two or more mixers and may be arranged for quadrature downconversion and upconversion, respectively. In some embodiments, the mixer circuitry 1106*a* of the receive signal path and the mixer circuitry 1106*a* of the transmit signal path may include two or more mixers and may be arranged for image rejection (e.g., Hartley image rejection). In some embodiments, the mixer circuitry 1106*a* of the receive signal path and the mixer circuitry 1106*a* may be arranged for direct downconversion and direct upconversion, respectively. In some embodiments, the mixer circuitry 1106*a* of the receive signal path and the mixer circuitry 1106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106*d* may be a fractional-N synthesizer or a fractional N/N+1 synthesizer, although the scope of the embodiments is not limited in this respect as other types of frequency synthesizers may be suitable. For example, synthesizer circuitry 1106*d* may be a delta-sigma synthesizer, a frequency multiplier, or a synthesizer comprising a phase-locked loop with a frequency divider.

The synthesizer circuitry 1106*d* may be configured to synthesize an output frequency for use by the mixer circuitry 1106*a* of the RF circuitry 1106 based on a frequency input and a divider control input. In some embodiments, the synthesizer circuitry 1106*d* may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106*d* of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 1112 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
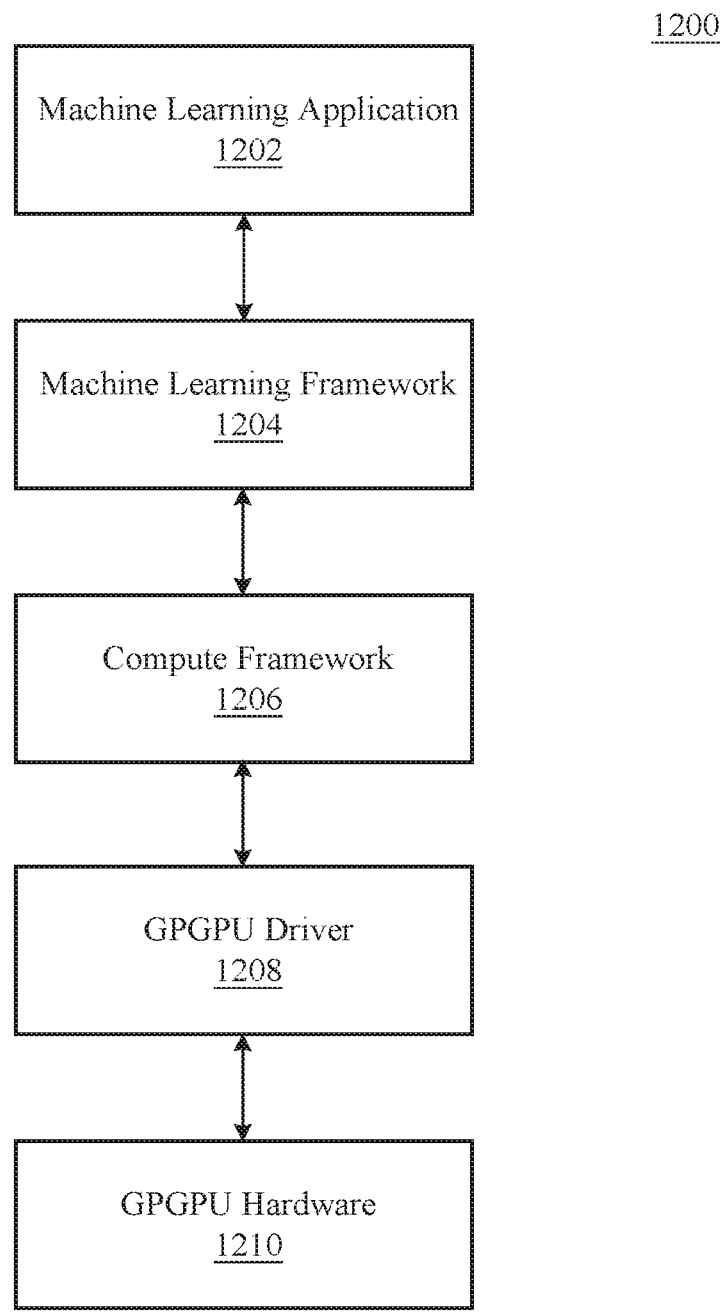
FIG. 12 is a generalized diagram of a machine learning software stack in accordance with one or more embodiments.

FIG. 12 is a generalized diagram of a machine learning software stack 1200. A machine learning application 1202 can be configured to train a neural network using a training dataset or to use a trained deep neural network to implement machine intelligence. The machine learning application 1202 can include training and inference functionality for a neural network and/or specialized software that can be used to train a neural network before deployment. The machine learning application 1202 can implement any type of machine intelligence including but not limited to image recognition, mapping and localization, autonomous navigation, speech synthesis, medical imaging, or language translation.

Hardware acceleration for the machine learning application 1202 can be enabled via a machine learning framework 1204. The machine learning framework 1204 can provide a library of machine learning primitives. Machine learning primitives are basic operations that are commonly performed by machine learning algorithms. Without the machine learning framework 1204, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 1204. Exemplary primitives include tensor convolutions, activation functions, and pooling, which are computational operations that are performed while training a convolutional neural network (CNN). The machine learning framework 1204 can also provide primitives to implement basic linear algebra subprograms performed by many machine-learning algorithms, such as matrix and vector operations.

The machine learning framework 1204 can process input data received from the machine learning application 1202 and generate the appropriate input to a compute framework 1206. The compute framework 1206 can abstract the underlying instructions provided to the GPGPU driver 1208 to enable the machine learning framework 1204 to take advantage of hardware acceleration via the GPGPU hardware 1210 without requiring the machine learning framework 1204 to have intimate knowledge of the architecture of the GPGPU hardware 1210. Additionally, the compute framework 1206 can enable hardware acceleration for the machine learning framework 1204 across a variety of types and generations of the GPGPU hardware 1210.

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 13:
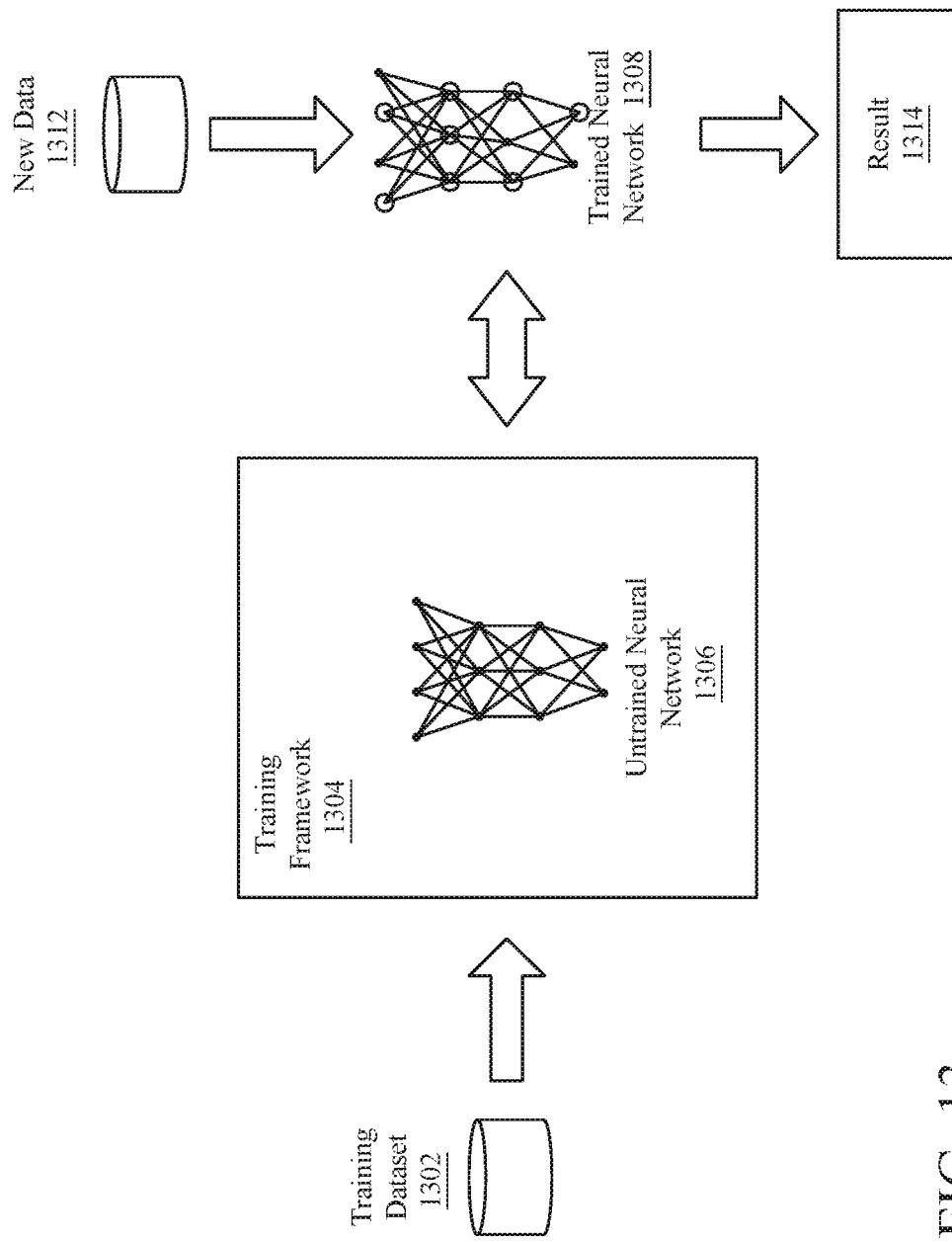
FIG. 13 illustrates training and deployment of a deep neural network in accordance with one or more embodiments.

FIG. 13 illustrates training and deployment of a deep neural network. Once a given network has been structured for a task the neural network is trained using a training dataset 1302. Various training frameworks have been developed to enable hardware acceleration of the training process. For example, the machine learning framework 1204 of FIG. 12 may be configured as a training framework 1304. The training framework 1304 can hook into an untrained neural network 1306 and enable the untrained neural net to be trained using the parallel processing resources described herein to generate a trained neural network 1308. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1302 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1304 can adjust to adjust the weights that control the untrained neural network 1306. The training framework 1304 can provide tools to monitor how well the untrained neural network 1306 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1308. The trained neural network 1308 can then be deployed to implement any number of machine learning operations.

Unsupervised learning is a learning method in which the network attempts to train itself using unlabeled data. Thus, for unsupervised learning the training dataset 1302 will include input data without any associated output data. The untrained neural network 1306 can learn groupings within the unlabeled input and can determine how individual inputs are related to the overall dataset. Unsupervised training can be used to generate a self-organizing map, which is a type of trained neural network 1307 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1302 includes a mix of labeled and unlabeled data of the same distribution. Incremental learning is a variant of supervised learning in which input data is continuously used to further train the model. Incremental learning enables the trained neural network 1308 to adapt to the new data 1312 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

The following examples pertain to further embodiments. Example one includes an apparatus to implement functional safety control logic (FSCL) comprising a field-programmable gate array (FPGA) comprising logic elements to be partitioned into a first section to implement one or more safety cores and a second section to implement one or more non-safety cores, a memory to couple to the safety core or to the non-safety core, and a trusted execution environment (TEE) to couple to a remote administrator via a network and to apply a configuration received from the remote administrator to the FPGA. Example two may include the subject matter of example one or any of the examples described herein, wherein the safety core is to function as an active agent for FSCL during operation, and the non-safety core is to function as a failover agent during operation, and wherein the non-safety core is to perform a liveliness check on the safety core to monitor for a failover and to take over as the active agent in the event of a failover. Example three may include the subject matter of example one or any of the examples described herein, wherein the non-safety core is to attempt to reset the safety core in response to the failover, and to reestablish the safety core as the active agent if the safety core is successfully reset. Example four may include the subject matter of example one or any of the examples described herein, wherein the FPGA includes a soft microcontroller (MCU) trusted execution environment (TEE) agent, and wherein the soft MCU TEE agent is to log the failover, or initiate a policy configured action, or a combination thereof, in response to the failover. Example five may include the subject matter of example one or any of the examples described herein, further comprising one or more additional FPGAs, wherein the additional FPGAs comprises one or more safety cores, or one or more non-safety cores, or a combination thereof. Example six may include the subject matter of example one or any of the examples described herein, wherein the TEE is to obtain geofence or other sensor attributes, FPGA configuration capabilities, FPGA reconfiguration capabilities, provision policies, management for the safety core, management for the non-safety core, or a combination thereof. Example seven may include the subject matter of example one or any of the examples described herein, wherein the TEE is to check for an updated configuration for the FPGA from the remote administrator, and to apply a bitstream update received from the remote administrator to the logic elements of the FPGA to reconfigure the FPGA with the updated reconfiguration. Example eight may include the subject matter of example one or any of the examples described herein, wherein the TEE is to reconfigure the FPGA dynamically based at least in part on one or more sensory attributes presented to the remote administrator and provided as a reconfiguration to the TEE for the FPGA. Example nine may include the subject matter of example one or any of the examples described herein, where at least some FSCL is disposed in the FPGA and decoupled from the TEE such that FSCL register-transfer level (RTL) source code in the FPGA may be evaluated without disclosing code in the TEE. Example ten may include the subject matter of example one or any of the examples described herein, wherein the FPGA comprises register-transfer level (RTL) logic configured by the TEE to provide communication between the safety core and the non-safety core such that the RTL logic is tamper resistant. Example eleven may include the subject matter of example one or any of the examples described herein, wherein the TEE comprises a Converged Security and Management Engine (CMSE) and the FGPA includes an FPGA accelerator, wherein one or more safety functions of the CMSE are to be offloaded to the FPGA accelerator. Example twelve may include the subject matter of example one or any of the examples described herein, wherein the FPGA is configured to allow the non-safety core to be reconfigured as a safety core in response to a failover. Example thirteen may include the subject matter of example one or any of the examples described herein, wherein the FPGA includes a soft microcontroller (MCU) trusted execution environment (TEE) agent to respond to a failover in a manner that is transparent to a host operating system or kernel, or a combination thereof. Example fourteen may include the subject matter of example one or any of the examples described herein, wherein the TEE is to send failover data to the remote administrator, and to receive an updated configuration from the remote administrator for the FPGA based at least in part on machine learning applied to the failover data from one or more crowdsourced analytics.

Example fifteen includes one or more machine-readable media having instructions stored thereon that, if executed, result in partitioning logical elements of a field-programmable gate array (FPGA) into a first section to implement one or more safety cores and a second section to implement one or more non-safety cores, coupling the FPGA via a trusted execution environment (TEE) to a remote administrator over a network, receiving a configuration for the FPGA from there remote administrator, and applying the configuration to the FPGA. Example sixteen may include the subject matter of example fifteen or any of the examples described herein, wherein the instructions, if executed, further result in operating the safety core as an active agent for functional safety control logic (FSCL), operating the non-safety core as a failover agent, performing a liveliness check on the safety core the non-safety core to monitor for a failover; and setting the non-safety core over as the active agent in the event of a failover. Example seventeen may include the subject matter of example fifteen or any of the examples described herein, wherein the instructions, if executed, further result in attempting to reset the safety core in response to the failover, and reestablishing the safety core as the active agent if the safety core is successfully reset. Example eighteen may include the subject matter of example fifteen or any of the examples described herein, wherein the instructions, if executed, further result in logging the failover, or initiating a policy configured action, or a combination thereof, in response to the failover. Example nineteen may include the subject matter of example fifteen or any of the examples described herein, wherein the instructions, if executed, further result in reconfiguring the FPGA dynamically based at least in part on one or more sensory attributes presented to the remote administrator and in response to reconfiguration received from the remote administer. Example twenty may include the subject matter of example fifteen or any of the examples described herein, wherein the instructions, if executed, further result in reconfiguring the non-safety core as a safety core in response to a failover. Example twenty-one may include the subject matter of example fifteen or any of the examples described herein, wherein the instructions, if executed, further result in responding to a failover in a manner that is transparent to a host operating system or kernel, or a combination thereof. Example twenty-two may include the subject matter of example fifteen or any of the examples described herein, wherein the instructions, if executed, further result in sending failover data to the remote administrator, and receiving an updated configuration from the remote administrator for the FPGA based at least in part on machine learning applied to the failover data from one or more crowdsourced analytics.

Example twenty-three includes a system to implement functional safety control logic (FSCL) comprising a field-programmable gate array (FPGA) comprising logic elements to be partitioned into a first section to implement one or more safety cores and a second section to implement one or more non-safety cores, a memory to couple to the safety core or to the non-safety core, a radio-frequency (RF) transceiver, and a trusted execution environment (TEE) to couple to a remote administrator over a network via the RF transceiver, and to apply a configuration received via the RF transceiver from the remote administrator to the FPGA. Example twenty-four may include the subject matter of example twenty-three or any of the examples described herein, wherein the safety core is to function as an active agent for FSCL during operation, and the non-safety core is to function as a failover agent during operation, and wherein the non-safety core is to perform a liveliness check on the safety core to monitor for a failover and to take over as the active agent in the event of a failover. Example twenty-five may include the subject matter of example twenty-three or any of the examples described herein, wherein the non-safety core is to attempt to reset the safety core in response to the failover, and to reestablish the safety core as the active agent if the safety core is successfully reset. Example twenty-six may include the subject matter of example twenty-three or any of the examples described herein, wherein the FPGA includes a soft microcontroller (MCU) trusted execution environment (TEE) agent, and wherein the soft MCE TEE agent is to log the failover, or initiate a policy configured action, or a combination thereof, in response to the failover. Example twenty-seven may include the subject matter of example twenty-three or any of the examples described herein, further comprising one or more additional FPGAs, wherein the additional FPGAs comprises one or more safety cores, or one or more non-safety cores, or a combination thereof.

Example twenty-eight includes a method, comprising partitioning logical elements of a field-programmable gate array (FPGA) into a first section to implement one or more safety cores and a second section to implement one or more non-safety cores, coupling the FPGA via a trusted execution environment (TEE) to a remote administrator over a network, receiving a configuration for the FPGA from there remote administrator, and applying the configuration to the FPGA. Example twenty-nine may include the subject matter of example twenty-eight or any of the examples described herein, further comprising operating the safety core as an active agent for functional safety control logic (FSCL), operating the non-safety core as a failover agent, performing a liveliness check on the safety core the non-safety core to monitor for a failover, and setting the non-safety core over as the active agent in the event of a failover. Example thirty may include the subject matter of example twenty-eight or any of the examples described herein, further comprising attempting to reset the safety core in response to the failover, and reestablishing the safety core as the active agent if the safety core is successfully reset. Example thirty-one may include the subject matter of example twenty-eight or any of the examples described herein, further comprising logging the failover, or initiating a policy configured action, or a combination thereof, in response to the failover. Example thirty-two may include the subject matter of example twenty-eight or any of the examples described herein, further comprising reconfiguring the FPGA dynamically based at least in part on one or more sensory attributes presented to the remote administrator and in response to reconfiguration received from the remote administer. Example thirty-three may include the subject matter of example twenty-eight or any of the examples described herein, further comprising reconfiguring the non-safety core as a safety core in response to a failover. Example thirty-four may include the subject matter of example twenty-eight or any of the examples described herein, further comprising responding to a failover in a manner that is transparent to a host operating system or kernel, or a combination thereof. Example thirty-five may include the subject matter of example twenty-eight or any of the examples described herein, further comprising sending failover data to the remote administrator, and receiving an updated configuration from the remote administrator for the FPGA based at least in part on machine learning applied to the failover data from one or more crowdsourced analytics.

Example thirty-six includes an apparatus comprising means for partitioning logical elements of a field-programmable gate array (FPGA) into a first section to implement one or more safety cores and a second section to implement one or more non-safety cores, means for coupling the FPGA via a trusted execution environment (TEE) to a remote administrator over a network, means for receiving a configuration for the FPGA from there remote administrator, and means for applying the configuration to the FPGA. Example thirty-seven may include the subject matter of example thirty-six or any of the examples described herein, further comprising, means for operating the safety core as an active agent for functional safety control logic (FSCL), means for operating the non-safety core as a failover agent, means for performing a liveliness check on the safety core the non-safety core to monitor for a failover, and means for setting the non-safety core over as the active agent in the event of a failover. Example thirty-eight may include the subject matter of example thirty-six or any of the examples described herein, further comprising means for attempting to reset the safety core in response to the failover, and means for reestablishing the safety core as the active agent if the safety core is successfully reset. Example thirty-nine may include the subject matter of example thirty-six or any of the examples described herein, further comprising means for logging the failover, or initiating a policy configured action, or a combination thereof, in response to the failover. Example forty may include the subject matter of example thirty-six or any of the examples described herein, further comprising means for reconfiguring the FPGA dynamically based at least in part on one or more sensory attributes presented to the remote administrator and in response to reconfiguration received from the remote administer. Example forty-one may include the subject matter of example thirty-six or any of the examples described herein, further comprising means for reconfiguring the non-safety core as a safety core in response to a failover. Example forty-two may include the subject matter of example thirty-six or any of the examples described herein, further comprising means for responding to a failover in a manner that is transparent to a host operating system or kernel, or a combination thereof. Example forty-three may include the subject matter of example thirty-six or any of the examples described herein, further comprising means for sending failover data to the remote administrator, and means for receiving an updated configuration from the remote administrator for the FPGA based at least in part on machine learning applied to the failover data from one or more crowdsourced analytics.

Example forty-four includes machine-readable medium including code, when executed, to cause a machine to perform the method of any of the examples herein. Example forty-five includes machine-readable storage including machine-readable instructions, when executed, to implement a method or realize an apparatus as recited in any of the examples herein.

In various embodiments, the operations discussed herein, e.g., with reference to the figures described herein, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to the present figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus to implement functional safety control logic (FSCL), comprising:
    a field-programmable gate array (FPGA) comprising logic elements to be partitioned into a first section to implement one or more safety cores and a second section to implement one or more non-safety cores;
    a memory to couple to the safety core or to the non-safety core; and
    a trusted execution environment (TEE) to couple to a remote administrator via a network and to apply a configuration received from the remote administrator to the FPGA;
    wherein the safety core is to function as an active agent for FSCL during operation, and the non-safety core is to function as a failover agent during operation, and wherein the non-safety core is to perform a liveliness check on the safety core to monitor for a failover and to take over as the active agent in the event of a failover; and
    wherein the FPGA includes a soft microcontroller (MCU) trusted execution environment (TEE) agent, and wherein the soft MCU TEE agent is to log the failover, or initiate a policy configured action, or a combination thereof, in response to the failover.

2. The apparatus of claim 1, wherein the non-safety core is to attempt to reset the safety core in response to the failover, and to reestablish the safety core as the active agent if the safety core is successfully reset.

3. The apparatus of claim 1, further comprising one or more additional FPGAs, wherein the additional FPGAs comprises one or more safety cores, or one or more non-safety cores, or a combination thereof.

4. The apparatus of claim 1, wherein the TEE is to obtain geofence or other sensor attributes, FPGA configuration capabilities, FPGA reconfiguration capabilities, provision policies, management for the safety core, management for the non-safety core, or a combination thereof.

5. The apparatus of claim 1, wherein the TEE is to check for an updated configuration for the FPGA from the remote administrator, and to apply a bitstream update received from the remote administrator to the logic elements of the FPGA to reconfigure the FPGA with the updated reconfiguration.

6. The apparatus of claim 1, wherein the TEE is to reconfigure the FPGA dynamically based at least in part on one or more sensory attributes presented to the remote administrator and provided as a reconfiguration to the TEE for the FPGA.

7. The apparatus of claim 1, where at least some FSCL is disposed in the FPGA and decoupled from the TEE such that FSCL register-transfer level (RTL) source code in the FPGA may be evaluated without disclosing code in the TEE.

8. The apparatus of claim 1, wherein the FPGA comprises register-transfer level (RTL) logic configured by the TEE to provide communication between the safety core and the non-safety core such that the RTL logic is tamper resistant.

9. The apparatus of claim 1, wherein the TEE comprises a Converged Security and Management Engine (CMSE) and the FGPA includes an FPGA accelerator, wherein one or more safety functions of the CMSE are to be offloaded to the FPGA accelerator.

10. The apparatus of claim 1, wherein the FPGA is configured to allow the non-safety core to be reconfigured as a safety core in response to a failover.

11. The apparatus of claim 1, wherein the FPGA includes a soft microcontroller (MCU) trusted execution environment (TEE) agent to respond to a failover in a manner that is transparent to a host operating system or kernel, or a combination thereof.

12. The apparatus of claim 1, wherein the TEE is to send failover data to the remote administrator, and to receive an updated configuration from the remote administrator for the FPGA based at least in part on machine learning applied to the failover data from one or more crowdsourced analytics.

13. One or more non-transitory machine-readable media having instructions stored thereon that, if executed, result in:
    partitioning logical elements of a field-programmable gate array (FPGA) into a first section to implement one or more safety cores and a second section to implement one or more non-safety cores;
    coupling the FPGA via a trusted execution environment (TEE) to a remote administrator over a network;
    receiving a configuration for the FPGA from the remote administrator;
    applying the configuration to the FPGA; and
    sending failover data to the remote administrator, and receiving an updated configuration from the remote administrator for the FPGA based at least in part on machine learning applied to the failover data from one or more crowdsourced analytics.

14. The one or more non-transitory machine-readable media of claim 13, wherein the instructions, if executed, further result in:
   operating the safety core as an active agent for functional safety control logic (FSCL);
   operating the non-safety core as a failover agent;
   performing a liveliness check on the safety core the non-safety core to monitor for a failover; and
   setting the non-safety core over as the active agent in the event of a failover.

15. The one or more non-transitory machine-readable media of claim 14, wherein the instructions, if executed, further result in attempting to reset the safety core in response to the failover, and reestablishing the safety core as the active agent if the safety core is successfully reset.

16. The one or more non-transitory machine-readable media of claim 14, wherein the instructions, if executed, further result in logging the failover, or initiating a policy configured action, or a combination thereof, in response to the failover.

17. The one or more non-transitory machine-readable media of claim 13 wherein the instructions, if executed, further result in reconfiguring the FPGA dynamically based at least in part on one or more sensory attributes presented to the remote administrator and in response to reconfiguration received from the remote administrator.

18. The one or more non-transitory machine-readable media of claim 13, wherein the instructions, if executed, further result in reconfiguring the non-safety core as a safety core in response to a failover.

19. The one or more non-transitory machine-readable media of claim 13, wherein the instructions, if executed, further result in responding to a failover in a manner that is transparent to a host operating system or kernel, or a combination thereof.

20. A system to implement functional safety control logic (FSCL), comprising:
   a field-programmable gate array (FPGA) comprising logic elements to be partitioned into a first section to implement one or more safety cores and a second section to implement one or more non-safety cores;
   a memory to couple to the safety core or to the non-safety core;
   a radio-frequency (RF) transceiver; and
   a trusted execution environment (TEE) to couple to a remote administrator over a network via the RF transceiver, and to apply a configuration received via the RF transceiver from the remote administrator to the FPGA;
   wherein the safety core is to function as an active agent for FSCL during operation, and the non-safety core is to function as a failover agent during operation, and wherein the non-safety core is to perform a liveliness check on the safety core to monitor for a failover and to take over as the active agent in the event of a failover; and
   wherein the FPGA includes a soft microcontroller (MCU) trusted execution environment (TEE) agent, and wherein the soft MCE TEE agent is to log the failover, or initiate a policy configured action, or a combination thereof, in response to the failover.

21. The system of claim 20, wherein the non-safety core is to attempt to reset the safety core in response to the failover, and to reestablish the safety core as the active agent if the safety core is successfully reset.

22. The system of claim 20, further comprising one or more additional FPGAs, wherein the additional FPGAs comprises one or more safety cores, or one or more non-safety cores, or a combination thereof.

* * * * *